United States Patent Office 3,427,311
Patented Feb. 11, 1969

3,427,311
5,11-DIHYDROINDOLO[3,2-c][2,1]-BENZOTHIA-ZINE-6,6-DIOXIDE COMPOUNDS
Bernard Loev, Broomall, Pa., assignor to Smith Kline & French Laboratories, Philadelphia, Pa., a corporation of Pennsylvania
No Drawing. Continuation-in-part of application Ser. No. 549,476, May 12, 1966. This application Feb. 13, 1968, Ser. No. 705,020
U.S. Cl. 260—243     7 Claims
Int. Cl. C07d 99/10; A61k 27/00

ABSTRACT OF THE DISCLOSURE 5-di-lower alkylaminoalkyl-5,11-dihydroindolo[3,2 - c] [2,1]benzothiazine-6,6-dioxides are prepared by reacting a phenylhydrazine with 3,4-dihydro-4-oxosulfostyril, cyclizing the resulting phenylhydrazone to give a 5,11-dihydroindolo[3,2-c][2,1]benzothiazine-6,6-dioxide intermediate and then reacting with a N,N-di-lower alkyl-haloalkylamine. The products have hypotensive and diuretic activity.

---

This application is a continuation-in-part of Ser. No. 549,476 filed May 12, 1966, now abandoned.

This invention relates to new 5-di-lower alkylaminoalkyl - 5,11 - dihydroindolo[3,2-c][2,1]benzothiazine-6,6-dioxide compounds having pharmacodynamic activity, in particular, hypotensive activity and, especially when the 5-di-lower alkylaminoalkyl group is a 5-di-lower alkyl-aminoethyl group, diuretic activity. The hypotensive activity is demonstrated by administration intravenously at doses of about 5–10 mg./kg. to dogs anesthetized with pentobarbital. The diuretic activity is demonstrated by oral administration to rats at doses of about 15–30 mg./kg. in a test for antagonism of anti-diuretic hormone in which anti-diuretic hormone in doses of 1 m$\mu$/100 g. body weight is administered subutaneously and water and alcohol loads are administered. This invention also relates to intermediates for preparing these pharmacodynamically active compounds.

The 5 - di - lower alkylaminoalkyl-5,11-dihydroindolo [3,2-c][2,1]benzothiazine-6,6-dioxide compounds of this invention are represented by the following formula:

FORMULA I

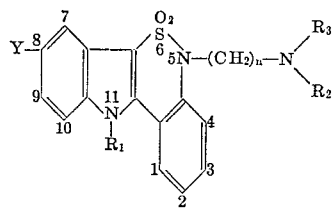

when:

Y is hydrogen, halogen or trifluoromethyl;
$R_1$ is hydrogen or lower alkyl;
$R_2$ and $R_3$ are lower alkyl and
$n$ is 2 or 3.

The pharmacodynamically active compounds of this invention have the basic 5-di-lower alkylaminoalkyl-5,11-dihydroindolo[3,2-c][2,1]benzothiazine-6,6-dioxide structure of Formula I. However, it is apparent to one skilled in the art that obvious nuclear substituents may be incorporated on the benzenoid ring of the benzothiazine nucleus. Such substituents, which are known to the art, are halogen, trifluoromethyl, lower alkyl, amino, hydroxy, lower alkoxy, lower alkylthio or methylenedioxy. Obvious nuclear substituents, which are known to the art, such as lower alkyl, hydroxy, lower alkoxy or methylenedioxy may be incorporated on the benzenoid ring of the indolo nucleus, for example, in place of the indicated Y substituents. These substituted compounds are useful as are the parent compounds.

An advantageous compound of this invention is represented by Formula I when Y is hydrogen, $R_2$ and $R_3$ are methyl and $n$ is 2.

This invention also includes pharmaceutically acceptable salts of the compounds of Formula I formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, innamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well known to the art.

The new compounds useful as intermediates in the preparation of the compounds of Formula I and further objects of this invention are represented by the following formula:

FORMULA II

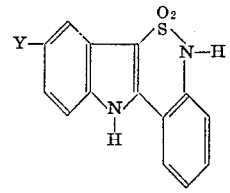

The term Y is as defined in Formula I.

Compounds having the basic 5,11-dihydroindolo[3,2-c] [2,1]-benzothiazine-6,6-dioxide structure of Formula II may have substituents such as halogen, trifluoromethyl, lower alkyl, amino, hydroxy, lower alkoxy, lower alkylthio or methylenedioxy incorporated on the benzenoid ring of the benzothiazine nucleus and substituents such as lower alkyl, hydroxy, lower alkoxy or methylenedioxy incorporated on the benzenoid-ring of the indolo nucleus, for example, in place of the indicated Y substituents. These substituted compounds are used, as described herebelow to prepare pharmacodynamically active compounds which have the basic structure of Formula I and which are correspondingly substituted.

The terms "lower alkyl" and "lower alkoxy" where used herein denote groups having 1–4, preferably 1–2, carbon atoms and "halogen" denotes chloro, bromo and fluoro.

Compounds of this invention are prepared by the following procedure:

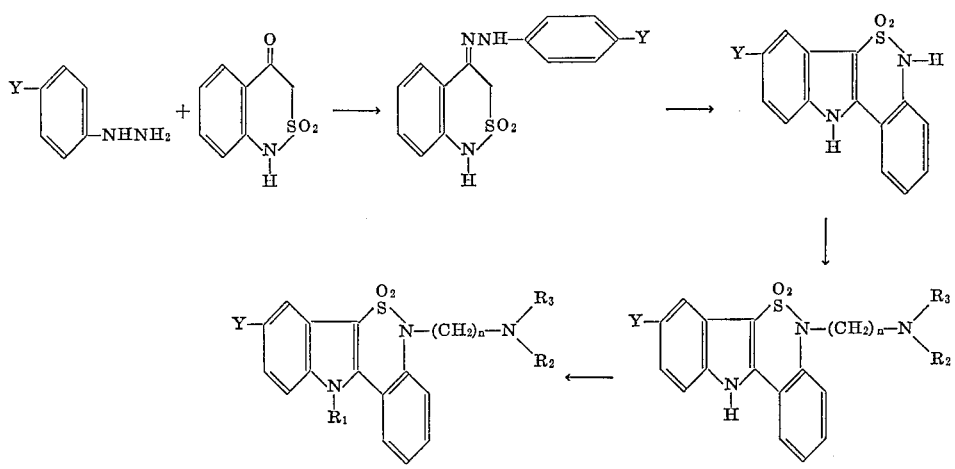

The term $R_1$ is lower alkyl and the term Y, $R_2$, $R_3$ and $n$ are as defined above.

According to the above procedure, a phenylhydrazine is reacted with 3,4-dihydro-4-oxosulfostyril to give the phenylhydrazone. The reaction is preferably carried out in an inert solvent such as a lower alkanol in the presence of acid such as hydrochloric or glacial acetic acid at elevated temperature, conveniently at reflux temperature.

The resulting hydrazone is cyclized by treating with an excess of polyphosphoric acid at elevated temperature, for example at about 85–150° C., or trifluoroacetic acid at about 50 to 70° C. to give the 5,11-dihydroindolo[3,2-c][2,1]benzothiazine-6,6-dioxide intermediate. This intermediate is treated with an equimolar amount or about a 10–15% excess of a base such as sodium hydride or sodium methoxide in an inert solvent and the resulting mixture is heated with a N,N-di-lower alkyl-haloalkylamine at about 85–125° C. to give the 5-di-lower alkylaminoalkyl-5,11 - dihydroindolo[3,2-c][2,1]benzothiazine-6,6-dioxide.

Alternatively, the 3,4-dihydro-4-oxosulfostyril starting material may be treated with a base such as sodium hydride or sodium methoxide in an inert solvent and the resulting mixture heated with a N,N-di-lower alkyl-haloalkylamine to give a 1-di-lower alkylaminoalkyl-3,4-dihydro-4-oxo-sulfostyril. Reacting this sulfostyril with a phenylhydrazine to form the phenylhydrazone and then cyclizing as described above gives the 5-di-lower alkylaminoalkyl - 5,11 - dihydroindolo[3,2-c][2,1]benzothiazine-6,6-dioxide.

The compounds of Formula I in which $R_1$ is lower alkyl are prepared by reacting the compounds in which $R_1$ is hydrogen with a base such as sodium hydride or butyl lithium and then with a lower alkyl halide in an inert solvent such as ether or dimethylsulfoxide at elevated temperature.

Substituents such as lower alkyl, hydroxy, lower alkoxy or methylenedioxy may be present on the phenyl ring of the phenylhydrazine starting material, for example, in place of the indicated Y substituents and substituents such as halogen, trifluoromethyl, lower alkyl, amino, hydroxy, lower alkoxy, lower alkylthio or methylenedioxy may be present on the benzenoid ring of the 3,4-dihydro-4-oxosulfostyril starting material in the above procedure (I) to give the correspondingly substituted 5-di-lower alkyl-aminoalkyl - 5,11 - dihydroindolo[3,2 - c][2,1]benzothiazine-6,6-dioxides.

The 3,4-dihydro-4-oxosulfostyril starting material is prepared as follows:

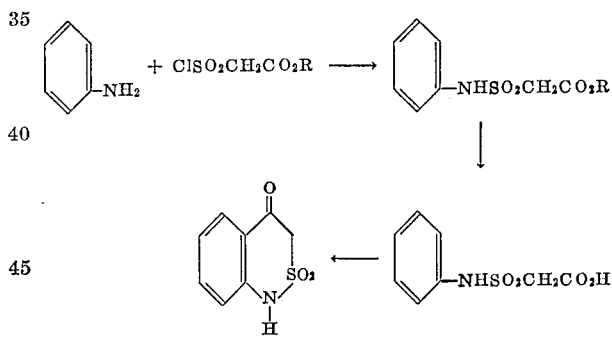

in which R is lower alkyl.

According to the above procedure aniline is condensed with a lower alkyl chlorosulfonylacetate to give a lower alkyl N-phenylsulfamoylacetate which is converted by heating with an alkali metal hydroxide such as sodium hydroxide to the N-phenylsulfamoylacetic acid. Cyclizing in an excess of polyphosphoric or sulfuric acid at about 100–150° C. or trifluoroacetic anhydride at 0–100° C. gives 3,4-dihydro-4-oxosulfostyril.

In the above procedure, substituents such as halogen, trifluoromethyl, lower alkyl, nitro, hydroxy, lower alkoxy, lower alkylthio or methylenedioxy may be present on the phenyl ring of the aniline starting material to prepare the correspondingly substituted 3,4-dihydro-4-oxosulfostyrils.

3,4-dihydro-4-oxosulfostyrils having an amino substituent on the benzenoid ring are prepared by reducing the corresponding nitro-substituted 3,4-dihydro-4-oxosulfostyril by hydrogenation in a lower alkanol at room temperature using palladium-on-carbon as catalyst.

The compounds of Formula I may be administered in conventional dosage forms by incorporating an appropriate dose of the compound with pharmaceutical carriers according to accepted pharmaceutical practices.

The following examples are not limiting but are illustrative of the compounds of this invention and the processes for their preparation.

Example 1

A concentrated solution of 40.0 g. of methyl chlorosulfonylacetate in ether is added to a solution of 45.3 g. of aniline in 500 ml. of ether at 10° C. After stirring at room temperature for an hour, the suspension is filtered and the filtrate is concentrated to give methyl N-phenylsulfomoylacetate.

The above prepared ester (20 g.) and 77 ml. of 10% sodium hydroxide solution are heated at reflux for three hours. The mixture is cooled, acidified and extracted with chloroform to give N-phenylsulfamoylacetic acid.

A mixture of 10 g. of the above prepared acid and 200 g. of polyphosphoric acid is heated to 125° C. and maintained at that temperature for 5 minutes with stirring. The mixture is cooled, then treated with ice water and filtered to give 3,4-dihydro-4-oxosulfostyril.

Fifty grams of 3,4-dihydro-4-oxosulfostyril is warmed on a steam bath with 625 ml. of ethanol until all the sulfostyril is in solution. To this solution is added 50 ml. of phenylhydrazine and 12.5 ml. of glacial acetic acid and the resulting solution is refluxed with stirring for 15 minutes. The mixture is heated for about 15 minutes on a steam bath, then chilled and filtered. The solid material is washed with isopropyl ether to give the phenylhydrazone of 3,4-dihydro-4-oxosulfostyril.

A mixture of 33 g. of the above prepared phenylhydrazone is stirred with a large excess of polyphosphoric acid, then heated on a steam bath with occasional stirring for about 35 minutes. The mixture is then poured onto ice-water, then made strongly basic with 40% sodium hydroxide solution and filtered. The filtrate is acidified with concentrated hydrochloric acid and filtered to give 5,11-dihydroindolo[3,2-c][2,1]benzothiazine-6,6-dioxide.

A dry benzene solution of 12.2 g. of N,N-dimethyl-2-chloroethylamine is added with stirring to a solution of 10.8 g. of 5,11-dihydroindolo[3,2-c][2,1]benzothiazine-6,6-dioxide in 100 ml. of dry dimethylsulfoxide and 2.0 g. of a 55% dispersion of sodium hydride in mineral oil and the resulting mixture is refluxed for 23 hours with stirring, then filtered. The filtrate is concentrated, poured into 300 ml. of water and the resulting mixture is extracted with ether. The ether extracts are washed with water, then dried over magnesium sulfate and evaporated to dryness. To the residue is added 75 ml. of ether and 25 ml. of ethanol. Filtering gives 5-(2-dimethylaminoethyl)-5,11-dihydroindolo[3,2-c][2,1]benzothiazine-6,6-dioxide.

One gram of the above prepared base suspended in water is treated with dilute hydrochloric acid. The mixture is heated until solution is complete and then chilled and filtered to give 5 - (2-dimethylaminoethyl)-5,11-dihydroindolo[3,2-c][2,1]benzothiazine-6,6-dioxide hydrochloride.

Example 2

To 11.6 g. of 5,11-dihydroindolo[3,2-c][2,1]benzothiazine-6,6-dioxide, prepared as in Example 1, in 100 ml. of dry dimethylsulfoxide is added with stirring 2.0 g. of a 55% dispersion of sodium hydride in mineral oil. After the hydrogen evolution stops, a solution of 12.15 g. of dimethyl-3-chloropropylamine in 100 ml. of anhydrous benzene is added dropwise, with stirring, over a 10 minute period and the resulting mixture is refluxed for 21 hours with stirring. The mixture is filtered and the filtrate is concentrated. The residue is poured into 300 ml. of water and the resulting mixture is extracted with ether. The ether extracts are washed with water and dried over magnesium sulfate. The ether is evaporated and the residue is dissolved in dry ether containing a few drops of methanol. Ethereal hydrochloric acid is added and the mixture is chilled and decanted to give a semi-solid material which is slurried with hot acetone. Chilling, filtering and recrystallizing from ethanol containing a small amount of methanol gives 5 - (3 - dimethylaminopropyl)-5,11-dihydroindolo[3,2-c][2,1]benzothiazine - 6,6 - dioxide hydrochloride.

Example 3

Using, in place of aniline in the procedure of Example 1, the following:

p-chloroaniline
o-chloroaniline
m-bromoaniline
p-fluoroaniline
p-trifluoromethylaniline
p-ethylaniline
p-aminophenol
p-anisidine
p-methylthioaniline
4-aminopyrocatechol
3,4-dimethoxyaniline
3,4-methylenedioxyaniline the following sulfostyrils are obtained:

6-chloro-3,4-dihydro-4-oxosulfostyril
8-chloro-3,4-dihydro-4-oxosulfostyril
5-(and 7)bromo-3,4-dihydro-4-oxosulfostyril
6-fluoro-3,4-dihydro-4-oxosulfostyril
3,4-dihydro-4-oxo-6-trifluoromethylsulfostyril
6-ethyl-3,4-dihydro-4-oxosulfostyril
6-amino-3,4-dihydro-4-oxosulfostyril
3,4-dihydro-6-methoxy-4-oxosulfostyril
3,4-dihydro-6-methylthio-4-oxosulfostyril
3,4-dihydro-5,6-(and 6,7)dihydroxy-4-oxosulfostyril
3,4-dihydro-5,6-(and 6,7)dimethoxy-4-oxosulfostyril
3,4 - dihydro - 5,6 - (and 6,7)methylenedioxy-4-oxosulfostyril.

Using each of the above prepared sulfostyrils in the procedure of Example 1, the following products are obtained, respectively:

2-chloro-5-(2-dimethylaminoethyl)-5,11-dihydroindolo[3,2-c][2,1]benzothiazine-6,6-dioxide
4-chloro-5-(2-dimethylaminoethyl)-5,11-dihydroindolo[3,2-c][2,1]benzothiazine-6,6-dioxide
1-(and 3)bromo-5-(2-dimethylaminoethyl)-5,11-dihydroindolo[3,2-c][2,1]benzothiazine-6,6-dioxide
5-(2-dimethylaminoethyl)-2-fluoro-5,11-dihydroindolo[3,2-c][2,1]benzothiazine-6,6-dioxide
5-(2-dimethylaminoethyl)-5,11-dihydro-2-trifluoromethylindolo[3,2-c][2,1]benzothiazine-6,6-dioxide
5-(2-dimethylaminoethyl)-2-ethyl-5,11-dihydroindolo[3,2-c][2,1]benzothiazine-6,6-dioxide
5-(2-dimethylaminoethyl)-5,11-dihydro-2-hydroxyindolo[3,2-c][2,1]benzothiazine-6,6-dioxide
5-(2-dimethylaminoethyl)-5,11-dihydro-2-methoxyindolo[3,2-c][2,1]benzothiazine-6,6-dioxide
5-(2-dimethylaminoethyl)-5,11-dihydro-2-methylthioindolo[3,2-c][2,1]benzothiazine-6,6-dioxide
5-(2-dimethylaminoethyl)-5,11-dihydro-1,2-(and 2,3)-dimethoxyindolo[3,2-c][2,1]benzothiazine-6,6-dioxide
5-(2-dimethylaminoethyl)-5,11-dihydro-1,2-(and 2,3)-dihydroxyindolo[3,2-c][2,1]benzothiazine-6,6-dioxide
5-(2-dimethylaminoethyl)-5,11-dihydro-1,2-(and 2,3)-methylenedioxyindolo[3,2-c][2,1]benzothiazine-6,6-dioxide.

The above prepared 1-(and 3)bromo compounds are separated into the 1-bromo and 3-bromo isomers by chromatography on alumina using methylene chloride as the solvent. Similarly, the 1,2- and 2,3-dimethoxy, -dihydroxy and -methylenedioxy isomers are separated.

One gram of 2-chloro-5-(2-dimethylaminoethyl)-5,11-dihydroindolo[3,2-c][2,1]benzothiazine - 6,6 - dioxide in ether is treated with hydrogen bromide to give the hydrobromide salt.

Example 4

By the procedure of Example 1, the following compounds are converted to the substituted 3,4-dihydro-4-oxosulfostyrils:

m-butylaniline 3,4-dichloroaniline
3,4-dibutoxyaniline
p-toluidine
p-butylthioaniline Using these sulfostyrils and p-hydrazinophenol in the procedure of Example 1, the products are, respectively:

1-(and 3)butyl-5-(2-dimethylaminoethyl)-5,11-dihydro-8-hydroxyindolo[3,2-c][2,1]benzothiazine-6,6-dioxide
1,2-(and 2,3)dichloro-5-(2-dimethylaminoethyl)-5,11-dihydro-8-hydroxyindolo[3,2-c][2,1]benzothiazine-6,6-dioxide
1,2-(and 2,3)dibutoxy-5-(2-dimethylaminoamino-ethyl)-5,11-dihydro-8-hydroxyindolo[3,2-c][2,1]-benzothiazine-6,6-dioxide
5-(2-dimethylaminoethyl)-5,11-dihydro-8-hydroxy-2-methylindolo[3,2-c][2,1]benzothiazine-6,6-dioxide
2-butylthio-5-(2-dimethylaminoethyl)-5,11-dihydro-8-hydroxyindolo[3,2-c][2,1]benzothiazine-6,6-dioxide.

The above prepared mixture of 1,2- and 2,3-dichloro-isomers is separated by chromatography on alumina using methylene chloride as the solvent. Similarly, the mixture of 1,2- and 2,3-dibutoxy isomers is separated.

Example 5

By the procedure of Example 1, using p-nitroaniline, 5 - (2 - dimethylaminoethyl) - 5,11 - dihydro - 2 - nitroindolo[3,2-c][2,1]benzothiazine-6,6-dioxide is obtained. Hydrogenating this 2-nitro compound in ethyl acetate at room temperature using palladium-on-carbon as catalyst gives 2-amino-5-(2-dimethylaminoethyl)-5,11-dihydroindolo[3,2-c][2,1]benzothiazine-6,6-dioxide.

Example 6

By the procedure of Example 1, using 3,4-dihydro-4-oxosulfostyril and the following substituted phenylhydrazines:

p-chlorophenylhydrazine
p-fluorophenylhydrazine
p-trifluoromethylphenylhydrazine
m-tolylhydrazine
p-methoxyphenylhydrazine
o-methoxyphenylhydrazine
3,4-dichlorophenylhydrazine
3,4-methylenedioxyphenylhydrazine the following products are obtained, respectively:

8-chloro-5-(2-dimethylaminoethyl)-5,11-dihydro-indolo[3,2-c][2,1]benzothiazine-6,6-dioxide
5-(2-dimethylaminoethyl)-8-fluoro-5,11-dihydro-indolo[3,2-c][2,1]benzothiazine-6,6-dioxide
5-(2-dimethylaminoethyl)-5,11-dihydro-8-trifluoromethylindolo[3,2-c][2,1]benzothiazine-6,6-dioxide
5-(2-dimethylaminoethyl)-5,11-dihydro-7-(and 9)-methylindolo[3,2-c][2,1]benzothiazine-6,6-dioxide
5-(2-dimethylaminoethyl)-5,11-dihydro-8-methoxy-indolo[3,2-c][2,1]benzothiazine-6,6-dioxide
5-(2-dimethylaminoethyl)-5,11-dihydro-10-methoxy-indolo[3,2-c][2,1]benzothiazine-6,6-dioxide
7,8-(and 8,9)dichloro-5-(2-dimethylaminoethyl)-5,11-dihydroindolo[3,2-c][2,1]benzothiazine-6,6-dioxide
5-(2-dimethylaminoethyl)-5,11-dihydro-7,8-(and 8,9)-methylenedioxyindolo[3,2-c][2,1]benzothiazine-6,6-dioxide.

Treating 5 - (2 - dimethylaminoethyl) - 5,11-dihydro-8-methoxyindolo[3,2-c][2,1]benzothiazine - 6,6 - dioxide in ether with glacial acetic acid, then concentrating in vacuo and filtering gives the acetate salt.

Example 7

By the procedure of Example 1, using 3,4-dihydro-4-oxosulfostyril and the following substituted phenylhydrazines (which are prepared from the corresponding hydrochloride salts by neutralizing an aqueous solution of the salt with hydrochloric acid, extracting with ether and removing the ether from the extracts):

p-bromophenylhydrazine
p-tolylhydrazine
p-butoxyphenylhydrazine
3,4-dimethoxyphenylhydrazine the following intermediates are prepared:

8-bromo-5,11-dihydroindolo[3,2-c][2,1]benzo-thiazine-6,6-dioxide
5-,11-dihydro-8-methylindolo[3,2-c][2,1]benzo-thiazine-6,6-dioxide
8-butoxy-5,11-dihydroindolo[3,2-c][2,1]benzo-thiazine-6,6-dioxide
5,11-dihydro-7,8-(and 8,9)dimethoxyindolo[3,2-c][2,1]benzothiazine-6,6-dioxide.

By the procedure of Example 1, the sodio derivative of each of the above intermediates is prepared and reacted with N,N-dimethyl-2-chloroethylamine to give the following products, respectively:

8-bromo-5-(2-dimethylaminoethyl)-5,11-dihydroin-dolo[3,2-c][2,1]benzothiazine-6,6-dioxide
5-(2-dimethylaminoethyl)-5,11-dihydro-8-methyl-indolo[3,2-c][2,1]benzothiazine-6,6-dioxide
8-butoxy-5-(2-dimethylaminoethyl)-5,11-dihydro-indolo[3,2-c][2,1]benzothiazine-6,6-dioxide
5-(2-dimethylaminoethyl)-5,11-dihydro-7,8-(and 8,9)dimethoxyindolo[3,2-c][2,1]benzothiazine-6,6-dioxide.

Example 8

By the procedure of Example 1 using 3,4-dihydro-4-oxosulfostyril and 3,4-dihydroxyphenylhydrazine (prepared by refluxing 3,4-dimethoxyphenylhydrazine with hydrobromic acid in acetic acid for four hours then concentrating in vacuo, adding aqueous sodium carbonate, extracting with methylene chloride, concentrating in vacuo and recrystallizing the residue from alcohol-hexane) the product is 5-(2-dimethylaminoethyl)-5,11-dihydro-7,8-(and 8,9)dihydroxyindolo[3,2-c][2,1]benzothiazine-6,6-dioxide. The mixture of isomers is separated to give the 7,8-dihydroxy and 8,9-dihydroxy compounds by chromatography on alumina using methylene chloride as the solvent.

5 - (2 - dimethylaminoethyl) - 5,11 - dihydro - 8,9-dihydroxyindolo[3,2-c][2,1]benzothiazine-6,6-dioxide in water is treated with dilute hydrochloric acid and the mixture is heated on a steam bath. Cooling and filtering gives the hydrochloride salt.

Example 9

To a mixture of 3.41 g. of 5-(2-dimethylaminoethyl)-5,11 - dihydroinodolo[3,2-c][2,1]benzothiazine - 6,6-dioxide (prepared as in Example 1) in 50 ml. of dimethylsulfoxide and 0.3 g. of sodium hydride in mineral oil is added 1.5 g. of methyl chloride. The resulting mixture is heated at reflux with stirring for 24 hours, then is filtered, concentrated and poured into water. Extracting with ether then drying and concentrating the extracts to dryness, adding ether-ethanol and filtering gives 5-(2-dimethylaminoethyl) - 5,11-dihydro-11-methylindolo[3,-2-c][2,1]benzothiazine-6,6-dioxide.

Similarly, using 4.1 g. of butyl bromide in place of N,N-dimethyl-2-chloroethylamine in the above procedure, the product is 11-butyl-5-(2-dimethylaminoethyl)-5,11-dihydroindolo[3,2-c][2,1]benzothiazine-6,6-dioxide.

Example 10

By the procedure of Example 2 using N,N-diethyl-3-chloropropylamine, the product is 5-(3-diethylaminopropyl) - 5,11-dihydroindolo[3,2-c][2,1]benzothiazine-6,-6-dioxide hydrochloride.

An aqueous solution of the above prepared salt is neutralized with aqueous sodium hydroxide. Extracting with ether, then drying the ether extracts and removing the ether in vacuo gives 5-(3-diethylaminopropyl)-5,11-dihydroindolo[3,2-c][2,1]benzothiazine-6,6-dioxide.

What is claimed is:

1. A compound of the formula:

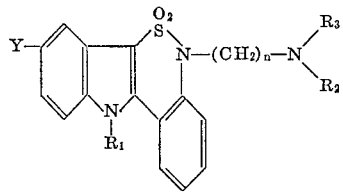

in which:

$Y$ is hydrogen, halogen or trifluoromethyl;
$R_1$ is hydrogen or lower alkyl;
$R_2$ and $R_3$ are lower alkyl; and
$n$ is 2 or 3 or pharmaceutically acceptable, acid addition salts thereof.

2. A compound according to claim 1 in which $n$ is 2.
3. A compound according to claim 1 in which $Y$ is hydrogen, $R_2$ and $R_3$ are methyl and $n$ is 2.
4. A compound according to claim 1 in which $Y$ is chloro, $R_2$ and $R_3$ are methyl and $n$ is 2.
5. A compound of the formula:

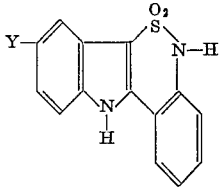

in which $Y$ is hydrogen, halogen or trifluoromethyl.

6. A compound according to claim 5 in which $Y$ is hydrogen.
7. A compound according to claim 5 in which $Y$ is chloro.

References Cited

FOREIGN PATENTS 247,020   4/1960   Australia.

HENRY R. JILES, *Primary Examiner.*

J. M. FORD, *Assistant Examiner.*

U.S. Cl. X.R.

260—470, 518, 999